(12) United States Patent
Kishi et al.

(10) Patent No.: US 11,492,483 B2
(45) Date of Patent: Nov. 8, 2022

(54) AQUEOUS INK, INK CARTRIDGE AND INK JET RECORDING METHOD

(71) Applicant: CANON KABUSHIKI KAISHA, Tokyo (JP)

(72) Inventors: Hiromitsu Kishi, Kawasaki (JP); Daiji Okamura, Tokyo (JP); Naotoshi Miyamachi, Tokyo (JP); Keisuke Inui, Kawasaki (JP); Hirohiko Yuasa, Kawasaki (JP); Naofumi Shimomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 16/914,554

(22) Filed: Jun. 29, 2020

(65) Prior Publication Data

US 2021/0002470 A1 Jan. 7, 2021

(30) Foreign Application Priority Data

Jul. 1, 2019 (JP) .............................. JP2019-122711
Jun. 18, 2020 (JP) .............................. JP2020-105518

(51) Int. Cl.
*C08L 33/20* (2006.01)
*C09D 11/30* (2014.01)
*B41J 2/175* (2006.01)

(52) U.S. Cl.
CPC .............. *C08L 33/20* (2013.01); *C09D 11/30* (2013.01); *B41J 2/17513* (2013.01); *C08L 2207/53* (2013.01)

(58) Field of Classification Search
CPC .. B41J 2/17513; B41J 2/1752; B41J 2/17553; C08F 212/08; C08F 220/06; C08F 220/14; C08F 220/1804; C08F 222/102; C08F 257/02; C08F 265/04; C08F 265/08; C09D 11/10; C09D 11/30; C09D 11/322; C09D 133/20; C09D 151/003; C08L 33/20; C08L 2207/53
See application file for complete search history.

(56) References Cited

U.S. PATENT DOCUMENTS

| | | | |
|---|---|---|---|
| 9,169,413 B2 | 10/2015 | Shiiba et al. | |
| 9,452,608 B2 | 9/2016 | Okamura et al. | |
| 9,738,803 B2 | 8/2017 | Horiuchi et al. | |
| 9,988,541 B2 | 6/2018 | Shimomura et al. | |
| 10,125,284 B2 | 11/2018 | Gouda et al. | |
| 10,131,806 B2 | 11/2018 | Hayashi et al. | |
| 10,253,197 B2 | 4/2019 | Shiiba et al. | |
| 2004/0006158 A1* | 1/2004 | Horie ..................... C09D 11/36 430/114 |
| 2019/0233667 A1 | 8/2019 | Cagle et al. | |

FOREIGN PATENT DOCUMENTS

| | | |
|---|---|---|
| JP | 2008-031276 A | 2/2008 |
| WO | 2018/143957 A1 | 8/2018 |

* cited by examiner

Primary Examiner — Anh T Vo
(74) Attorney, Agent, or Firm — Venable LLP

(57) ABSTRACT

Provided is an aqueous ink for ink jet, containing a resin particle, and a cyclic amide-based, water-soluble organic solvent. The resin particle has a core portion that contains a cyano group-containing unit, and a shell portion that contains an aromatic group-containing unit, an anionic group-containing unit and a unit derived from a crosslinking agent, but free of cyano group-containing unit. Ink jet recording using the aqueous ink can record images that excel in abrasion resistance and gloss clarity.

10 Claims, 2 Drawing Sheets

AQUEOUS INK, INK CARTRIDGE AND INK JET RECORDING METHOD

BACKGROUND OF THE INVENTION

Field of the Invention

The present invention relates to an aqueous ink, an ink cartridge, and an ink jet recording method.

Description of the Related Art

Recent advancement in technology has enabled simple and inexpensive printing of high-definition and glossy images, comparable to those given by silver-halide printing or offset printing, by using ink jet recording method. Ink for ink jet recording uses coloring materials which are categorized into dyes and pigments, among which pigments prevail in these years from the viewpoint of image fastness such as gas resistance, light resistance and water resistance.

Ink that contains pigment as a coloring material (pigment ink), when applied to a recording medium having a glossy face such as coated paper, will be fixed on the surface of the recording medium to record an image. Hence the image recorded using the pigment ink is likely to be scratched when rubbed on the surface or likely to be deteriorated in glossiness, expressing a need for improving so-called abrasion resistance. Among others, applications in photographic printing or graphic art printing, using the recording medium such as coated paper, require a high level of abrasion resistance such as causing almost no change of glossiness of image even rubbed on the surface.

The pigment ink, capable of recording images with high fastness, has also been used for creating recorded matters for notice, enjoying increased opportunity of use for recording images on non-absorbent recording media such as film. The recorded matters for outdoor notice, often rubbed with a squeegee for posting, necessarily has strong abrasion resistance.

As a response to the request, there has been proposed, for example, an aqueous ink that contains a copolymer obtained by polymerizing a specific monomer, and excels in adhesiveness on a film and in abrasion resistance (Japanese Patent Application Laid-Open No. 2008-031276). There has also been proposed an ink composition that employs a specific water-soluble organic solvent so as to lower the minimum film forming temperature, and has improved adhesiveness on a non-absorbent medium and abrasion resistance (International Publication No. WO2018/143957).

The present inventors investigated into the inks proposed in Japanese Patent Application Laid-Open No. 2008-031276 and International Publication No. WO2018/143957. The results clarified that images recorded using these inks on a recording medium such as coated paper would be improved in the abrasion resistance, but would unfortunately tend to degrade gloss clarity of image. The gloss clarity is defined as a property that gives an index for sharpness of some image when projected on the image. The image looks blurred when the gloss clarity is low, whereas looks clear when the gloss clarity is high.

It is therefore an object of the present invention to provide an aqueous ink capable of recording images that excel in abrasion resistance and gloss clarity. It is another object of the present invention to provide an ink cartridge and an ink jet recording method using such aqueous ink.

SUMMARY OF THE INVENTION

According to the present invention, there is provided an aqueous ink for ink jet, including a resin particle and a water-soluble organic solvent, the resin particle having a core portion that contains a cyano group-containing unit, and a shell portion that contains an aromatic group-containing unit, an anionic group-containing unit and a unit derived from a crosslinking agent, but free of cyano group-containing unit, and the water-soluble organic solvent containing a cyclic amide.

The present invention can successfully provide an aqueous ink capable of recording images that excel in abrasion resistance and gloss clarity. The present invention can also successfully provide an ink cartridge and an ink jet recording method using such aqueous ink.

Further features of the present invention will become apparent from the following description of exemplary embodiments with reference to the attached drawings.

DESCRIPTION OF THE EMBODIMENTS

Figure 1:
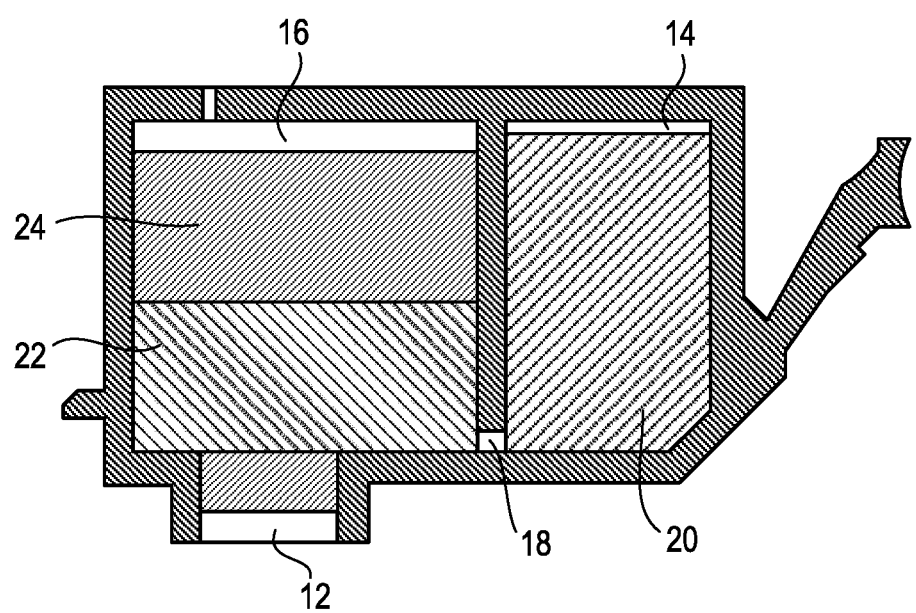
FIG. 1 is a cross sectional view schematically illustrating an embodiment of the ink cartridge of the present invention.

The present invention will further be detailed, referring to preferred embodiments. In the present invention, any compound in the form of salt, although dissociates to produce ions in the ink, will be referred to as "containing salt" for convenience sake. The aqueous ink for ink jet may be occasionally and simply referred to as "ink". Physical data are those observed at normal temperature (25° C.) unless otherwise specifically noted. In the present invention, the "unit" that constitutes the resin means a repeating unit derived from a single monomer.

In the process of the investigations into the abrasion resistance of images recorded with an ink that contains a resin particle, the present inventors examined combinations of the unit contained in the resin constituting the resin particle, and the water-soluble organic solvent to be contained in the ink. The present inventors finally found that the abrasion resistance of recorded images was improved when the resin particle formed of a resin containing a cyano group-containing unit was combined with a cyclic amide-based, water-soluble organic solvent. Further investigations revealed that, in the aforementioned combination, a specific film formation can proceed at normal temperature around 25° C., even if the resin particle has a glass transition temperature more than 100° C., which normally needs heating for the film formation.

Cyclic amides, such as the cyclic amide-based, water-soluble organic solvent, are known as components that behave as a film forming aid. Such improvement of the abrasion resistance of images was not observed, when the cyclic amides was combined with the resin particle free of the cyano group-containing unit. Moreover, such improvement of the abrasion resistance of images was also not observed, when a glycol ether-based, water-soluble organic solvent, having been known to function likewise as a film forming aid, is combined with the resin particle formed of a resin containing cyano group-containing unit. The reason why only the combination of the resin particle formed of a resin containing cyano group-containing unit and the cyclic amide-based, water-soluble organic solvent can demonstrate the aforementioned specific event is presumed as follows. That is, high polarity cyano group and again high polarity amide group can interact strongly to thereby promote movement of the resin chain, and this supposedly led to improved abrasion resistance of images.

The ink, that contains the resin particle formed of a resin containing the cyano group-containing unit and the cyclic amides, was however found to yield the recorded images with insufficient gloss clarity, when applied onto a recording medium such as coated paper. Our thorough investigations revealed that the ink, whose resin particle can specifically form a film at normal temperature, was likely to cause so-called beading, which is unevenness of images possibly caused when rapid film formation partially suppresses water-soluble organic solvent and water in the ink from permeating, resulting in flooding of the ink. This tends to produce surface irregularity of images, enough to degrade the gloss clarity of images. Such event is not observed when images are recorded on a non-absorbent recording medium.

Yet further investigations revealed that images with good gloss clarity could be recorded while enhancing the abrasion resistance, by using the resin particle having a core-shell structure, in which the cyano group-containing unit is contained only in the core portion. The cyano group-containing unit, which is a major causal factor of promoting rapid film formation, is covered by the shell portion, so as to be blocked from exposing to the surface of the resin particle. This can consequently delay the film formation, and can supposedly allow the film formation to proceed, while enjoying enough time for the water-soluble organic solvent and water contained in the ink to permeate into the recording medium.

The shell portion, arranged so as to cover the core portion, has the anionic group-containing unit which is a hydrophilic unit, aiming at ensuring ejection property of the ink by keeping a stable state of dispersion of the resin particle. The anionic group-containing unit, when contained in the shell portion, enhances hydrophilicity of the resin constituting the resin particle, and would make coverage of the shell portion over the core portion incomplete. It was found that the cyano group-containing unit of the core portion therefore becomes more likely to expose on the surface of the resin particle, and this makes the gloss clarity less likely to be improved.

The present inventors investigated into a structure in which the shell portion strongly covers the core portion, to finally found that it is critical for the shell portion to contain the aromatic group-containing unit and the crosslinking agent-derived unit. Hydrophobic interaction and π-π interaction among the aromatic group-containing units successfully suppress the shell portion from becoming excessively water-soluble. In addition, the shell portion given the crosslinked structure can suppress movement of the resin chains that form the shell portion, and this supposedly improves gloss clarity of images to be recorded.

<Aqueous Ink>

The ink of the present invention is an aqueous ink for ink jet, containing the resin particle, and the cyclic amide-based, water-soluble organic solvent. The resin particle has the core portion that contains a cyano group-containing unit, and the shell portion that contains the aromatic group-containing unit, the anionic group-containing unit and the crosslinking agent-derived unit, but free of the cyano group-containing unit. The individual components constituting the ink will be explained below. The present invention is by no means limited by the description below, without departing from the spirit thereof. In the description below, "(meth)acrylic acid", "(meth)acrylate" and "(meth)acryloyl" means "acrylic acid, methacrylic acid", "acrylate, methacrylate" and "acryloyl, methacryloyl", respectively. The "unit" of the resin in the context of the present invention means a repeating unit derived from a single monomer. The ink of the present invention is not necessarily an active energy ray curable one, and does not necessarily have any monomer having a polymerizable group. The ink of the present invention is also not always necessarily the one that emits light upon being irradiated by light out of the visible region.

(Resin Particle)

The "resin particle" in the context of this patent specification means a resin dispersible in an aqueous medium, and can stay in the aqueous medium while keeping the particle size. Hence, the resin particle can stay dispersed in the ink, that is, in the form of resin emulsion. In addition, the resin particle is not always necessarily the one that incorporates a coloring material (dye, pigment, and invisible coloring material that turns visible when emitting fluorescence).

Whether a certain resin is "resin particle" or not may be determined by the method below. First, prepared is a liquid in which a resin is neutralized with an alkali (sodium hydroxide, potassium hydroxide, etc.) whose content is equivalent to the acid value (solid resin content: 10% by mass). Next, the prepared liquid is diluted 10-fold (volume basis) with pure water to prepare a sample solution. If the sample solution, when observed by dynamic light scattering, showed the resin particle with measurable size, such resin particle may be determined to be the "resin particle". For the dynamic light scattering, employable is a particle size distribution analyzer (trade name "UPA-EX150" from Nikkiso Co., Ltd., for example). Typical measurement conditions in this process include Set-Zero time: 30 seconds, number of runs: 3, measurement time: 180 seconds, shape: sphere and refractive index: 1.59. The particle size distribution analyzer and the measurement conditions to be employed are, of course, not limited to those described above. Use of the neutralized resin for the measurement of particle size is for the purpose of confirming whether the resin, having been made less likely to form the particle after neutralization, can still form the particle or not. The resin capable of keeping the particle form even under such condition can stay as the particle also in the aqueous ink.

The resin particle employed here has the core portion, and the shell portion that covers the core portion, which is so-called core-shell structure. The core portion has the aromatic group-containing unit and the cyano group-containing unit. With the core portion containing the cyano group-containing unit, the film formation at normal temperature can specifically proceed, due to strong interaction between the cyano group, and the cyclic amides described later.

The shell portion has the aromatic group-containing unit, the anionic group-containing unit and the crosslinking agent-derived unit. The shell portion contains substantially no cyano group-containing unit. With the shell portion containing substantially no cyano group-containing unit, the resin particle will have substantially no cyano group on the surface thereof, and thereby the gloss clarity of images can be improved.

The shell portion, containing the aromatic group-containing unit, can cause hydrophobic interaction with the core portion. This makes the shell portion less likely to separate from the core portion, and makes the cyano group of the core portion less likely to expose on the surface of the resin particle, so that gloss clarity of images improve.

The monomer that later becomes, upon polymerization, the cyano group-containing unit preferably has in the molecule thereof one polymerizable functional group such as ethylenic unsaturated bond. The monomer is specifically exemplified by acrylonitrile, methacrylonitrile, chloroacrylonitrile and 2-cyanoethyl (meth)acrylate. The monomer that later becomes, upon polymerization, the cyano group-containing unit is preferably any of those free of anionic group or aromatic group, and those preferably having a molecular weight of 300 or less, which is more preferably 200 or less. Among them, acrylonitrile and methacrylonitrile are particularly preferred, from the viewpoint of excellence of abrasion resistance of images, excellence of reactivity during polymerization and excellence of stability of the obtainable resin particle.

The monomer that later becomes, upon polymerization, the aromatic group-containing unit preferably has in the molecule thereof one polymerizable functional group such as ethylenic unsaturated bond. The monomer is specifically exemplified by styrene, vinyltoluene, p-fluoroetyrene, p-chlorostyrene, a-methylstyrene, 2-vinylnaphthalene, 9-vinylanthracene, 9-vinylcarbazole, phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth)acrylate and (1-pyrenyl)methyl (meth)acrylate. The monomer that later becomes, upon polymerization, the aromatic group-containing unit is preferably any of those free of anionic group or cyano group, and those preferably having a molecular weight of 300 or less, which is more preferably 200 or less. Among them, styrene and derivative thereof are preferred, and styrene and vinyltoluene are particularly preferred, from the viewpoint of excellence of reactivity during polymerization and excellence of stability of the obtainable resin particle.

The anionic group in the anionic group-containing unit preferably has in the molecule thereof one polymerizable functional group such as ethylenic unsaturated bond. The monomer is specifically exemplified by carboxylic acid group, phenolic hydroxy group and phosphoric ester group. Among them, carboxylic acid group is preferred from the viewpoint of good stability of the resin particle in the ink. The monomer that later becomes, upon polymerization, the anionic group-containing unit is exemplified by (meth) acrylic acid, p-vinylbenzoic acid, 4-vinylphenol, β-carboxyethyl (meth)acrylate, 2-hydroxyethyl methacrylate phospohate, 2-hydroxyethyl (meth)acrylate and 3-hydroxypropyl (meth)acrylate. The monomer that later becomes, upon polymerization, the anionic group-containing unit is preferably any of those free of aromatic group or cyano group, and those preferably having a molecular weight of 300 or less, which is more preferably 200 or less. Among them, (meth) acrylic acid is particularly preferred. The anionic group in the anionic group-containing unit is preferably carboxylic acid group only. The anionic group may be present in either of an acid or salt form. In the latter case, either a portion or the whole of the salt may be dissociated. Examples of a cation which is the counter ion of the anionic group in salt form include alkali metal cations, ammonium and organic ammoniums.

The crosslinking agent that later becomes, upon polymerization, the crosslinking agent-derived unit is exemplified by a compound having in the molecule thereof two or more polymerizable functional groups such as ethylenic unsaturated bond. Such crosslinking agent is exemplified by diene compounds such as butadiene and isoprene; bifunctional (meth)acrylates such as 1,4-butanediol di(meth)acrylate, 1,9-nonanediol di(meth)acrylate, (mono-, di-, tri-, poly-) ethylene glycol di(meth)acrylate, (mono-, di-, tri-, poly-) propylene glycol di(meth)acrylate, (mono-, di-, tri-, poly-) tetramethylene glycol di(meth)acrylate, ethylene oxide modified bisphenol A di(meth)acrylate, 2-hydroxy-3-(meth) acryloyloxypropyl methacrylate, propoxylated ethoxylated bisphenol A di(meth)acrylate, ethoxylated bisphenol A di(meth)acrylate, 9,9-bis(4-(2-(meth)acryloyloxyethoxy) phenyl)fluorene, tricyclodecanedimethanol di(meth)acrylate, 1,10-decanediol di(meth)acrylate, 1,6-hexanediol di(meth)acrylate, neopentyl glycol di(meth)acrylate, tricyclodecanedimethanol di(meth)acrylate, ethoxylated polypropylene glycol di(meth)acrylate and glycerin di(meth) acrylate; trifunctional (meth)acrylates such as tris(2-(meth) acryloyloxyethyl)isocyanurate, trimethylolpropane tri (meth)acrylate, tris(2-hydroxyethyl)isocyanurate tri(meth) acrylate, ethoxylated trimethylolpropane tri(meth)acrylate, pentaerythritol tri(meth)acrylate, propoxylated trimethylolpropane tri(meth)acrylate, propoxylated glyceryl tri(meth) acrylate, ethoxylated isocyanuric acid tri(meth)acrylate, ε-caprolactone modified tris(2-(meth)acryloyloxyethyl) isocyanurate and ethylene oxide modified trimethylolpropane tri(meth)acrylate; tetrafunctional (meth)acrylates such as ditrimethylolpropane tetra(meth)acrylate, ethoxylated pentaerythritol tetra(meth)acrylate and pentaerythritol tetra(meth)acrylate; and divinylbenzene.

The crosslinking agent preferably has a molecular weight of more than 200, which is more preferably more than 300, and is even more preferably 400 or more. The crosslinking agent preferably has in the molecule thereof two ethylenic unsaturated bonds. By employing the compound having in the molecule thereof two ethylenic unsaturated bonds as the crosslinking agent, the resin particle may be suppressed from causing aggregation otherwise possibly caused by excessive crosslinkage, and will have more uniform particle size. Among the compounds having in the molecules thereof two ethylenic unsaturated bonds, more preferred are divinylbenzene and ethylene glycol di(meth)acrylate.

The glycidyl group-containing crosslinking agent is exemplified by ethylene glycol diglycidyl ether, polyethylene glycol diglycidyl ether, sorbitol polyethylene glycol diglycidyl ether, glycerol polyglycidyl ether, diglycerol polyglycidyl ether, polyglycerol polyglycidyl ether, pentaerythritol polyglycidyl ether, propylene glycol diglycidyl ether, polypropylene glycol diglycidyl ether, trimethylolpropane polyglycidyl ether and neopentyl glycol diglycidyl ether.

The resin particle, when manufactured, can employ a surfactant. The resin particle, manufactured in the presence of the surfactant, will advantageously have stabilized particle size and shape. The surfactant, if it were nonreactive, would tend to separate from the resin particle. The surfactant, if separated in the ink, would adversely affect physical properties of the ink, to thereby degrade ejection property and so forth. Hence, the surfactant employed for manufacture of the resin particle is preferably a reactive surfactant.

The reactive surfactant employable here is preferably a compound having a polymerizable functional group such as (meth)acryloyl group, maleyl group, vinyl group or allyl group, bound inside or at the terminal of the molecule composed of a hydrophilic part and a hydrophobic part. The hydrophilic part is exemplified by polyoxyalkylene chain such as ethylene oxide chain and propylene oxide chain. Meanwhile, the hydrophobic part is exemplified by alkyl group, aryl group and any structure combining these groups. The hydrophilic part and the hydrophobic part may be linked via a linking group such as ether group. The reactive surfactant preferably has a molecular weight of more than 200, which is more preferably more than 300, and is even more preferably 400 or more.

The reactive surfactant is specifically exemplified by polyoxyethylene nonylpropenylphenyl ether, ammonium polyoxyethylene nonylpropenylphenyl ether sulfate, ammonium polyoxyethylene-1-(allyloxymethyl)alkyl ether sulfate, α-hydro-ω-(1-alkoxymethyl-2-(2-propenyloxy)ethoxy)-poly(oxy-1,2-ethanediyl)), α-[1-{(allyloxy)methyl}-2-(nonylphenoxy)ethyl]-ω-hydroxypolyoxyethylene, α-sulfo-ω-(1-alkoxymethyl-2-(2-propenyloxy)ethoxy)-poly(oxy-1, 2-ethanediyl) ammonium salt, sodium 2-sulfoethyl methacrylate, bis (polyoxyethylene polycyclic phenyl ether) methacrylate sulfuric ester salt, alkoxypolyethylene glycol methacrylate, alkoxypolyethylene glycol maleate, polyoxyalkylene alkenyl ether, ammonium polyoxyalkylene alkenyl ether sulfate, vinyl ether alkoxylate, alkylallylsulfosaccinic acid salt, polyoxyalkylene methacrylate sulfuric ester salt and unsaturated phosphoric acid ester. Among them, preferred is α-sulfo-ω-(1-alkoxymethyl-2-(2-propenyloxy) ethoxy)-poly(oxy-1,2-ethanediyl) ammonium salt (trade names "ADEKA REASOAP" SR-10S, SR-10, SR-20, SR-3025, SE-10N and SE-20N, from ADEKA Corporation).

The core portion and the shell portion of the resin particle may contain any unit other than those described above, without damaging the effects of the present invention. Such unit other than those described above preferably has one polymerizable functional group in the molecule, which is exemplified by a unit derived from ethylenic unsaturated monomer.

The ethylenic unsaturated monomer is exemplified by alkenes such as ethylene and propylene; alkyl (meth)acrylates such as methyl (meth)acrylate, ethyl (meth)acrylate, butyl (meth)acrylate, lauryl (meth)acrylate and hexadecyl (meth)acrylate; monocyclic (meth)acrylates such as cyclopropyl (meth)acrylate, cyclohexyl (meth)acrylate, cyclooctyl (meth)acrylate and cyclodecyl (meth)acrylate; bicyclic (meth)acrylates such as isobornyl (meth)acrylate and norbornyl (meth)acrylate; tricyclic (meth)acrylates such as adamanthyl (meth)acrylate, dicyclopentanyl (meth)acrylate and dicyclo pentenyloxyethyl (meth)acrylate; and nonionic hydrophilic group-containing (meth)acrylates such as methoxy(mono-, di-, tri-, poly-)ethylene glycol (meth)acrylate. The ethylenic unsaturated monomer is preferably any of those free of anionic group, cyano group or aromatic group, and preferably having a molecular weight of 300 or less, which is more preferably 200 or less. Among them, preferred are alkenes having 1 or more and 22 or less carbon atoms; and alkyl (meth)acrylate whose alkyl group having 1 or more and 22 or less carbon atoms. In view of easy controllability of physical properties of the resin particle, and obtainability of the resin particle that excels in polymerization stability, more preferred are alkyl (meth)acrylate whose alkyl group having 1 or more and 12 or less carbon atoms, and particularly preferred are methyl (meth)acrylate and ethyl (meth)acrylate.

As described previously, the core portion has the cyano group-containing unit. Percentage (% by mass) of the cyano group-containing unit in the core portion is preferably 10% by mass or more to 60% by mass or less, and more preferably 20% by mass or more to 55% by mass or less. With the percentage of the cyano group-containing unit in the core portion less than 10% by mass, abrasion resistance of image would slightly decrease. Meanwhile, with the percentage of cyano group-containing unit in the core portion more than 60% by mass, a part of cyano group of the core portion would be more likely to expose on the surface of the resin particle, and gloss clarity of images would slightly degrade. Percentage (% by mass) of the additional unit in the core portion is preferably 70% by mass or less. The "additional unit" in the core portion is defined as a unit other than the cyano group-containing unit. The "additional unit" in the core portion preferably has, in the structure thereof, aromatic group-containing unit, anionic unit and a reactive surfactant-derived unit. The core portion is preferably not cross-linked. That is, the "additional unit" in the core portion is preferably free of the crosslinking agent-derived unit.

The shell portion contains, as described previously, the aromatic group-containing unit, the anionic group-containing unit and the crosslinking agent-derived unit, but contains substantially no cyano group-containing unit. Percentage (% by mass) of the aromatic group-containing unit in the shell portion is preferably 1% by mass or more to 60% by mass or less, and more preferably 10% by mass or more to 50% by mass or less.

Percentage (% by mass) of the anionic group-containing unit in the shell portion is preferably 5% by mass or more to 30% by mass or less, and more preferably 10% by mass or more to 20% by mass or less. With the percentage of the anionic group-containing unit in the shell portion less than 5% by mass, ejection property of the ink would slightly decrease. Meanwhile, with the percentage of the anionic group-containing unit in the shell portion more than 30% by mass, the hydrophilicity of the shell portion would excessively increase. This would make the shell portion more likely to separate from the core portion, and makes the cyano group of the core portion more likely to expose on the surface of the resin particle, so that gloss clarity of images would slightly degrade.

Percentage (% by mass) of the crosslinking agent-derived unit in the shell portion is preferably 30% by mass or more to 80% by mass or less, and is more preferably 40% by mass or more to 70% by mass or less. With the percentage of the crosslinking agent-derived unit in the shell portion less than 30% by mass, the cyano group in the core portion will be more likely to expose in a situation that the shell portion will become excessively hydrophilic due to collaboration with the water-soluble resin, and gloss clarity of images would slightly degrade. Meanwhile, with the percentage of the crosslinking agent-derived unit in the shell portion more than 80% by mass, ejection property of the ink would slightly degrade.

Percentage (% by mass) of the additional unit in the shell portion is preferably 10% by mass or less. The "additional unit" in the shell portion is defined as a unit other than the aromatic group-containing unit, the anionic group-containing unit and the crosslinking agent-derived unit. The "additional unit" in the shell portion preferably has, in the structure thereof, a reactive surfactant-derived unit.

Ratio by mass of the core portion and the shell portion of the resin particle represented by (core portion):(shell portion), with the total being 100, is preferably 50:50 to 95:5, and more preferably 60:40 to 90:10. The resin particle preferably has a 50% particle size in a volume-based cumulative distribution (D50) of 50 nm or more to 120 nm or less. The 50% particle size in a volume-based cumulative distribution (D50) of the resin particle may be measured in the same way by which whether the resin particle or not is determined as described previously.

Content (% by mass) of the resin particle in the ink is preferably 1.0% by mass or more and 10.0% by mass or less, based on the total mass of ink. With the content of the resin particle less than 1.0% by mass, abrasion resistance of image would slightly degrade. Meanwhile, with the content of the resin particle more than 10.0% by mass, gloss clarity of images would slightly degrade.

The resin particle preferably has a glass transition temperature of 95° C. or more. With the glass transition temperature of less than 95° C., the resin particle would be more susceptible to rapid film formation, and this would slightly degrade gloss clarity of image. Also the ejection property of ink would slightly degrade. The resin particle preferably has a glass transition temperature of 150° C. or less, which is even more preferably 120° C. or less. The glass transition temperature of the resin particle may be measured using a differential scanning calorimeter (for example, trade name "DSC Q1000", from TA Instruments).

The ink, that contains the resin particle with the glass transition temperature fallen within the aforementioned ranges, preferably has a minimum film forming temperature of 30° C. or less. With the minimum film forming temperature more than 30° C., another means for heating would be necessary for making the images express abrasion resistance. The ink preferably has a minimum film forming temperature of 0° C. or more, which is more preferably 15° C. or more. The minimum film forming temperature of ink may be measured by using a minimum film forming temperature meter (for example, trade name "MFFT-90", from Rhopoint Instruments), according to a method in compliance with ASTM D2354.

[Method for Manufacturing Resin Particle]

The resin particle may be manufactured according to any of known methods including emulsion polymerization, mini-emulsion polymerization, seed polymerization and phase inversion emulsification.

[Method for Verifying Resin Particle]

Structure of the resin particle may be verified by a method having processes (i) to (iii) below. Although the description below will deal with a case where the resin particle is extracted from the ink for analysis and verification, also the resin particle extracted from aqueous dispersion and so forth may be analyzed and verified in the same way.

(i) Isolation of Resin Particle

The resin particle contained in the ink may be separated and extracted by density gradient centrifugation. Among types of the density gradient centrifugation, density gradient sedimentation velocity method can separate and extract the resin particle, on the basis of difference of sedimentation coefficients among the components. Meanwhile, among types of the density gradient centrifugation, density gradient sedimentation equilibrium method can separate and extract the resin particle, on the basis of difference of density among the components.

(ii) Confirmation and Separation of Layer Structure

The resin particle is dyed and fixed with ruthenium tetroxide, and then embedded in an epoxy resin for stable immobilization. The resin particle embedded in the epoxy resin is then sliced using an ultramicrotome, and the cross-sectional face is observed under a scanning transmission electron microscope (STEM). The layer structure of the resin particle can be confirmed by observing a cross-sectional face that falls on the center of gravity of the resin particle. Also elements contained in the layers constituting the resin particles (core portion and shell portion) may be determined by quantitatively analyzing the sample resin particle embedded in the epoxy resin, using a STEM-EDX having an energy distributed X-ray spectrometer combined therein.

(iii) Analysis of Unit (Monomer) Constituting Resin in Individual Layers

The sample resin particle, from which the resins in the individual layers are separated, may exist in the form of dispersion liquid. The sample may alternatively be a film obtained by drying the resin particle. The sample resin particle is dissolved in an organic solvent, then separated into the individual layers by gel permeation chromatography (GPC), and resin components constituting the individual layers are fractionated. The thus fractionated resin components are subjected to element analysis. Apart from this, the thus fractionated resin was pretreated by acid digestion (with addition of hydrofluoric acid) or alkali fusion, and subjected to quantitative analysis of inorganic components based on induction-coupled plasma emission spectrometry. The layer of the resin particle having been formed by the fractionated resin component may be determined by comparing results of the element analysis and the quantitative analysis of inorganic components, with results of the element analysis using STEM-EDX obtained in (ii) above.

The fractionated resin is also analyzed by nuclear magnetic resonance (NMR) and matrix-assisted laser desorption/ionization mass spectrometry (MALDI-MS). These analyses give information on types and ratios of the unit (monomer) and crosslinking component constituting the resin. The monomer produced as a result of depolymerization is also detectable directly by analyzing the resin fractionated by pyrolytic chromatography.

(Cyclic Amides)

The water-soluble organic solvent to be contained in the ink contains the cyclic amides. With the cyclic amides contained therein, the film formation at normal temperature can proceed specifically, owing to strong interaction between the cyano group in the core portion constituting the resin particle, and cyclic amides.

The cyclic amides are exemplified by pyrrolidones, imidazolidinones and hydantoins. Among them, compounds below are preferred from the viewpoints of high promoting activity for film forming, excellence of abrasion resistance of images and convenience for handling. That is, preferred is at least one compound selected from the group consisting of 2-pyrrolidone, N-methyl-2-pyrrolidone, 1-(2-hydroxyethyl)-2-pyrrolidone, 1,3-dimethyl-2-imidazolidinone and 1,3-bis(2-hydroxyethyl)-5,5-dimethylhydantoin.

Content (% by mass) of the cyclic amides in the ink, on the basis of the total mass of ink, is preferably 1.0% by mass or more to 20.0% by mass or less. With the content of cyclic amides less than 1.0% by mass, the abrasion resistance of images would slightly degrade. Meanwhile, with the content of cyclic amides more than 20.0% by mass, the ejection property of ink would slightly degrade.

Content (% by mass) of the cyclic amides in the ink, when expressed in mass ratio relative to content (% by mass) of the resin particle, is 0.5 times or more to 2.5 times or less. With the mass ratio less than 0.5 times, the abrasion resistance of images would slightly degrade. Meanwhile, with the mass ratio more than 2.5 times, the gloss clarity of images would slightly degrade.

(Water-Soluble Resin)

In a preferred case, the ink additionally contains a water-soluble resin. The water-soluble resin is preferably acrylic resin or urethane resin, and more preferably acrylic resin. The water-soluble resin preferably contains the aromatic group-containing unit. In the presence of the water-soluble resin having the aromatic group-containing unit, the aromatic group of the water-soluble resin can cause hydrophobic interaction and $\pi$-$\pi$ interaction with the aromatic group of the resin particle. As a consequence, a resin film formed on the recording medium will have improved strength, and the abrasion resistance of images further improves. Moreover, the water-soluble resin adheres to the resin particle and assists dispersion of the resin particle, thereby readily improving the ejection property of the ink.

As the aromatic group-containing unit in the water-soluble acrylic resin, the aforementioned aromatic group-containing unit may be used. The water-soluble acrylic resin preferably contains an anionic group-containing unit, besides the aromatic group-containing unit. The aforementioned anionic group-containing unit may be used as the anionic group-containing unit in the water-soluble acrylic resin.

The water-soluble acrylic resin may further contain a unit (additional unit) other than the aromatic group-containing unit and the anionic group-containing unit. Monomer that constitutes the additional unit, including those having substituents such as alkoxy group or hydroxy group, is exemplified by 2-hydroxyethyl (meth)acrylate; 3-hydroxypropyl (meth)acrylate; methoxy (mono-, di-, tri-, poly-)ethylene glycol (meth)acrylates; alkenes such as ethylene and propylene; alkyl (meth)acrylates such as methyl (meth)acrylate, ethyl (meth)acrylate, butyl (meth)acrylate, lauryl (meth) acrylate and hexadecyl (meth)acrylate; monocyclic (meth) acrylates such as cyclopropyl (meth)acrylate, cyclohexyl (meth)acrylate, cyclooctyl (meth)acrylate and cyclodecyl (meth)acrylate; bicyclic (meth)acrylates such as isobornyl (meth)acrylate and norbornyl (meth)acrylate; and tricyclic (meth)acrylates such as adamanthyl (meth)acrylate, dicyclopentanyl (meth)acrylate and dicyclopentenyloxyethyl (meth)acrylate. The water-soluble acrylic resin may be any of random copolymer, block copolymer or graft copolymer.

The water-soluble urethane resin employable here may be obtained by reaction between a polyisocyanate, and a component capable of reacting therewith (polyol having acid group, polyol free of acid group, polyamine, etc.). This may be a product obtained by further reaction with a chain extender or crosslinking agent. At least one of these components employable here has an aromatic group.

The water-soluble resin preferably has an acid value of 100 mgKOH/g or more to 180 mgKOH/g or less. With the acid value of the water-soluble resin less than 100 mgKOH/g, the abrasion resistance of images would slightly degrade. Meanwhile, with the acid value of the water-soluble resin more than 180 mgKOH/g, the anionic group in the shell portion of the resin particle will be neutralized by an ion derived from the anionic group of the water-soluble resin, making the shell portion more likely to dissolve in water, and making the coverage over the core portion loosened. This makes the cyano group-containing core portion more likely to expose, and the abrasion resistance of images would slightly degrade.

Content (% by mass) of the water-soluble resin in the ink is preferably 0.1% by mass or more and 5.0% by mass or less, based on the total mass of ink. Content (% by mass) of the water-soluble resin, when expressed in mass ratio relative to content (% by mass) of the resin particle, is preferably 0.1 times or more to 2.0 times or less.

Physical properties of the water-soluble resin, such as chemical composition, weight-average molecular weight and acid value, may be measured according to any of known methods. More specifically, the physical properties of the water-soluble resin may be measured by analyzing precipitate and supernatant obtainable after centrifugation of the ink. The water-soluble resin, although analyzable while being dissolved in the ink, is more preferably analyzed after extracted from the ink for improved accuracy of measurement. More specifically, the ink is preferably centrifuged at 75,000 rpm to obtain the supernatant, to which an excessive amount of acid (hydrochloric acid, etc.) is added, and the precipitated resin is dried and analyzed.

Types of the units that constitute the water-soluble resin may be confirmed by analyzing the resin, after separated from the ink, using a pyrolysis gas chromatograph/mass spectrometer (Pyro-GC/MS). In addition, molecular weights and types of monomers that constitute the individual units may be quantitatively confirmed by nuclear magnetic resonance (13C-NMR) or Fourier transform infrared spectrophotometry (FT-IR).

The acid value of the water-soluble resin may be measured by titration. More specifically, the water-soluble resin is dissolved in tetrahydrofuran (THF) to prepare a sample for measurement. The acid value of the water-soluble resin may be measured by subjecting the thus prepared sample for measurement to potentiometric titration, using an automatic potentiometric titrator and potassium hydroxide titration solution in ethanol. The automatic potentiometric titrator employable here is typically trade name "AT510" from Kyoto Electronics Manufacturing Co., Ltd.

The weight average molecular weight of the water-soluble resin may be measured by gel permeation chromatography (GPC). Measurement conditions for GPC are as follows:

Apparatus: Alliance GPC 2695 (from Waters Corporation)
Column: four serial Shodex KF-806M columns (from Showa Denko K.K.)
Mobile phase: THF (special grade)
Flow rate: 1.0 mL/min
Oven temperature: 40.0° C.
Injection volume of sample solution: 0.1 mL
Detector: RI (refractive index)
Polystyrene standard samples: PS-1 and PS-2 (from Polymer Laboratories Ltd., 17 variations with molecular weights of U.S. Pat. Nos. 7,500,000, 2,560,000, 841, 700, 377,400, 320,000, 210,500, 148,000, 96,000, 59,500, 50,400, 28,500, 20,650, 10,850, 5,460, 2,930, 1,300 and 580).

(Coloring Material)

In a preferred case, the ink additionally contains a coloring material. Any ink free of the coloring material may be combined with another ink containing the coloring material. The coloring material employable here includes pigment and dye. Content (% by mass) of the coloring material in the ink, based on the total mass of ink, is preferably 0.5% by mass or more to 15.0% by mass or less, and more preferably 1.0% by mass or more to 10.0% by mass or less. Pigment is preferably used as the coloring material.

The pigment is specifically exemplified by inorganic pigments such as carbon black and titanium oxide; and organic pigments such as azo, phthalocyanine, quinacridone, isoindolinone, imidazolone, diketopyrrolopyrrole and dioxazine.

The pigment employable here, when classified by dispersion modes, includes resin dispersion pigment using a resin as a dispersant, and self-dispersion pigment having a hydrophilic group bound on the surface of pigment particle. Also employable are resin-bound pigment having an organic group including a resin chemically bound to the surface of pigment particle, and microcapsule pigment having pigment particle covered with a resin or the like. Among them, it is preferable to use a resin dispersion pigment in which a resin as a dispersant is physically adsorbed to the surface of the pigment particle, rather than using the resin-bound pigment or microcapsule pigment.

The resin dispersant for dispersing the pigment into an aqueous medium employable here is preferably the one capable of dispersing the pigment into an aqueous medium, with the aid of action of an anionic group. The water-soluble resin may be used as the resin dispersant. Content (% by mass) of the pigment in the ink, when expressed in mass ratio based on content (% by mass) of the resin dispersant, is preferably 0.3 times or more to 10.0 times or less.

The self-dispersion pigment employable here is the one having the anionic group such as carboxylate group, sulfonate group and phosphonate group bound to the surface of pigment particle, directly or via other atomic group (—R—). The anionic group may have an acid form or a salt form, and the salt form may have a part thereof remained dissociated, or the whole thereof remained dissociated. For the anionic group having the salt form, a cation that serves as the counter ion is exemplified by alkali metal cation, ammonium and organic ammonium. The other atomic group (—R—) is specifically exemplified by straight-chain or branched alkylene group having 1 to 12 carbon atoms; arylene groups such as phenylene group and naphthylene group; carbonyl group; imino group; amide group; sulfonyl group; ester group; and ether group. Also groups given by combinations of any of these groups are acceptable.

The dye is preferably any of those having the anionic group. The dye is specifically exemplified by azo, triphenylmethane, (aza)phthalocyanine, xanthene and anthrapyridone. The coloring material contained in the ink is preferably the pigment, and more preferably the resin dispersion pigment.

(Aqueous Medium)

The ink is an aqueous ink containing at least water as the aqueous medium. The ink may further contain a water-soluble organic solvent as the aqueous medium. The water is preferably deionized water or ion-exchanged water. Content (% by mass) of water in the ink is preferably 50.0% by mass or more and 95.0% by mass or less, based on the total mass of ink. The water-soluble organic solvent may be any of those commonly used for the ink. Examples include alcohols, (poly)alkylene glycols, glycol ethers, nitrogen-containing compounds other than the aforementioned cyclic amides and sulfur-containing compounds. Content (% by mass) of the water-soluble organic solvent in the ink is preferably 3.0% by mass or more and 50.0% by mass or less, based on the total mass of ink. The content of the water-soluble organic solvent takes cyclic amides into account.

(Other Additives)

Besides the components described previously, the ink may optionally contain a water-soluble organic compound that exists as solid at normal temperature, which is exemplified by polyhydric alcohols such as trimethylolpropane and trimethylolethane; and urea derivatives such as urea and ethylene urea. The ink may further contain various optional additives such as surfactant, pH adjuster, antirust agent, antiseptic agent, anti-mold agent, antioxidant, anti-reduction agent, evaporation promoter, chelating agent and other resin.

(Physical Properties of Ink)

The ink, being an aqueous ink applicable to the ink jet system, preferably has physical properties that are suitably controlled. More specifically, the ink preferably has a surface tension at 25° C., when measured by the plate method, of 20 mN/m or more to 60 mN/m or less, which is more preferably 25 mN/m or more to 45 mN/m or less. Viscosity of the ink at 25° C. is preferably 1.0 mPa·s or more to 10.0 mPa·s or less, and more preferably 1.0 mPa·s or more to 5.0 mPa·s or less. pH of the ink at 25° C. is preferably 7.0 or more to 10.0 or less.

<Ink Cartridge>

The ink cartridge of the present invention has an ink, and an ink storage portion that stores the ink. The ink stored in this ink storage portion is the aqueous ink of the present invention described above. FIG. 1 is a cross sectional view schematically illustrating an embodiment of the ink cartridge of the present invention. As illustrated in FIG. 1, the ink cartridge has, on the bottom face thereof, an ink supply port 12 through which the ink is supplied to the recording head. The ink cartridge has in the inside thereof the ink storage portion for storing the ink. The ink storage portion is composed of an ink storage chamber 14 and an absorber storage chamber 16 which communicate with each other through a communication hole 18. The absorber storage chamber 16 also communicates with the ink supply port 12. The ink storage chamber 14 stores a fluidic ink 20, and the absorber storage chamber 16 stores absorbers 22 and 24 that retain the ink in an impregnated manner. The ink storage portion may alternatively have no ink storage chamber for storing the fluidic ink, and instead may retain the whole ink to be stored with the absorber. Alternatively, the ink storage portion may have no absorber, and instead may store the whole ink in a fluidic state. Again alternatively, the ink cartridge may be composed of the ink storage portion and the recording head.

<Ink Jet Recording Method>

The ink jet recording method of the present invention is a method by which an image is recorded on a recording medium with the aforementioned aqueous ink of the present invention, ejected from the recording head of an ink jet system. System for ejecting ink is exemplified by a system of applying mechanical energy to the ink, and a system of applying heat energy to the ink. In the present invention, the system of applying heat energy to the ink before ejection is particularly preferred. Processes in the ink jet recording method may be any of known ones, except that the ink of the present invention is used.

Figure 2A:
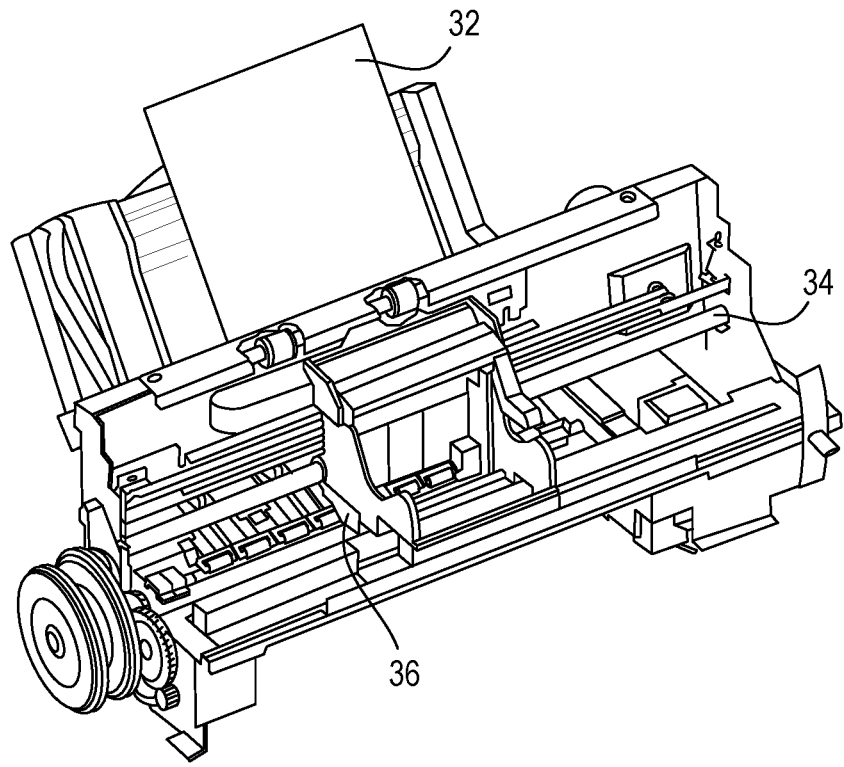
FIG. 2A is a perspective view illustrating an essential part of an ink jet recording apparatus used for the ink jet recording method of the present invention.
Figure 2B:
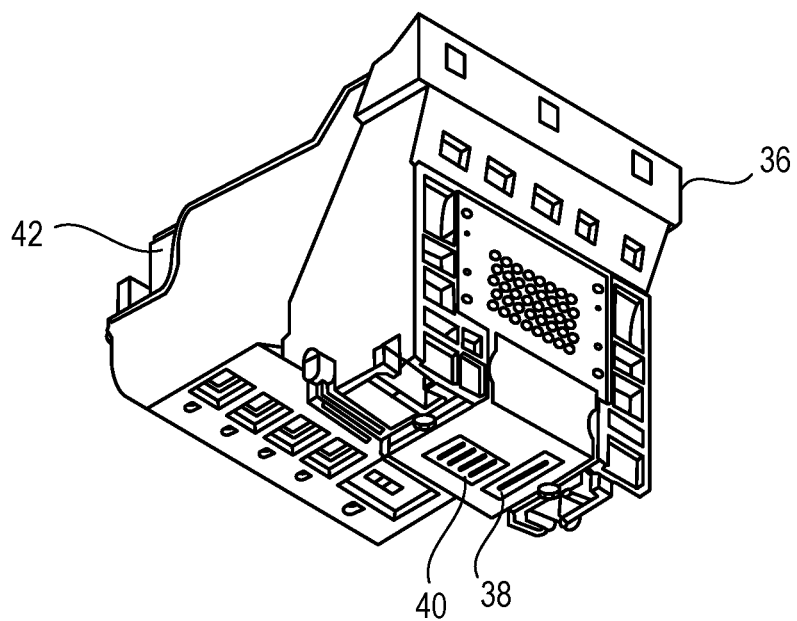
FIG. 2B is a perspective view illustrating a head cartridge of an ink jet recording apparatus, used for the ink jet recording method of the present invention.

FIGS. 2A and 2B are drawings schematically illustrating an exemplary ink jet recording apparatus used for the ink jet recording method of the present invention, wherein FIG. 2A is a perspective view illustrating a major part of the recording apparatus, and FIG. 2B is a perspective view illustrating a head cartridge. The ink jet recording apparatus has a conveying unit (not illustrated) that conveys a recording medium 32, and a carriage shaft 34. The carriage shaft 34 is designed to have a head cartridge 36 mounted thereon. The head cartridge 36 has recording heads 38 and 40, and is designed to have an ink cartridge 42 set thereon. In the duration over which the head cartridge 36 is conveyed in the main scanning direction along the carriage shaft 34, the ink (not illustrated) is ejected from the recording heads 38 and 40 towards the recording medium 32. Then as a result of conveyance of the recording medium 32 by the conveying unit (not illustrated) in the sub-scanning direction, an image is recorded on the recording medium 32. The recording medium 32, although not specifically limited, is preferably paper-based recording medium (recording medium permeable to ink), such as a recording medium free of coating layer, such as plain paper; or a recording medium having coating layer, such as glossy paper and matte paper. The recording medium is not necessarily for transfer use.

EXAMPLES

The present invention will further be detailed below, referring to Examples and Comparative Examples. The present invention is, however, by no means limited to these Examples, without departing from the spirit thereof. All amounts of components given in "part(s)" or "%" are on the mass basis unless otherwise specifically noted.

<Preparation of Pigment Dispersion>

A solution obtained by dissolving 100 g of concentrated hydrochloric acid into 110 g of water was cooled to 5° C., into which 30 g of 4-aminophthalic acid was added. A container containing the solution was put on an ice bath, the solution was kept under stiffing 10° C. or below, to which a solution obtained by dissolving 36 g of sodium nitrite into 180 g of deionized water at 5° C. was added. The content was stirred for 15 minutes, carbon black (trade name "Monarch 1000", from Cabot Corporation) was added under stirring, and the content was further stirred for 15 minutes to thereby obtain a slurry. The obtained slurry was filtered through filter paper (trade name "Standard Filter Paper No. 2", from Advantec MFG, Inc.), the particles are thoroughly washed with water, dried in an oven at 110° C., to obtain a self-dispersion pigment. A proper amount of water was added to adjust the content of pigment, to thereby obtain a pigment dispersion with a pigment content of 15.0%.

<Preparation of Water Dispersion of Resin Particle>

(Resin Particles 1 to 16)

A reaction vessel equipped with a stirrer was set on a warm water bath. In the reaction vessel, poured was 1,178 parts of water, and the inner temperature was kept at 70° C. A monomer later becoming the cyano group-containing unit, monomers later becoming the aromatic group-containing units (monomers for control example also included), a monomer later becoming the anionic group-containing unit, and a reactive surfactant later becoming the reactive surfactant unit were prepared. These components were mixed according to the amount of charge (part) and proportion (%) summarized in Table 1. A mixed monomer solution for forming the core portion was thus prepared. The reactive surfactant employed here was "ADEKA REASOAP SR-10" (trade name, from ADEKA Corporation). On the other hand, 1.9 parts of potassium persulfate and 659 parts of water were mixed to prepare an aqueous polymerization initiator solution 1. The mixed monomer solution for forming the core portion and the aqueous polymerization initiator solution 1 were added dropwise in parallel into the reaction vessel over 60 minutes. After completion of the dropwise addition, the content was kept stirred for additional 30 minutes, to thereby synthesize a particle later becoming the core portion of the resin particle. Note that the core portion was not synthesized for a resin particle 10.

Next, a monomer later becoming the aromatic group-containing unit (also including a monomer for the control example), a monomer later becoming the anionic group-containing unit, a crosslinking agent later becoming the crosslinking agent-derived unit, and a reactive surfactant later becoming the reactive surfactant unit were prepared. The thus prepared monomers were mixed according to the amount of charge (parts) and proportion (%) summarized in Table 1, to thereby prepare a mixed monomer solution for forming the shell portion. The reactive surfactant employed here was "ADEKA REASOAP SR-10" (trade name, from ADEKA Corporation). On the other hand, 0.1 parts of potassium persulfate and 133 parts of water were mixed to prepare an aqueous polymerization initiator solution 2. Into the reaction vessel containing the particle later becoming the core portion, added dropwise were the mixed monomer solution for forming the shell portion and the aqueous polymerization initiator solution 2, in parallel over 10 minutes. After completion of the dropwise addition, the content was kept stirred at 80° C. for 10 minutes so as to synthesize the shell portion, to thereby synthesize a resin particle having a core-shell structure in which the particle constituting the core portion is covered with the resin constituting the shell portion. Note that the shell portion was not synthesized for a resin particle 11.

A proper amount of an aqueous 8 mol/L potassium hydroxide solution was then added in the reaction vessel, and the liquid was adjusted to pH 8.5. A proper amount of water was further added, to thereby obtain an aqueous dispersion of each resin particle, with a content of resin particle of 20% and a particle size (cumulative 50% particle diameter in volume-based particle size distribution) of 80 nm. The particle size of resin particle was measured using a particle size analyzer based on the dynamic light scattering system (trade name "UPA-EX150", from Nikkiso Co., Ltd.), under conditions including Set-Zero time: 30 seconds, number of runs: 3, measurement time: 180 seconds, shape: sphere and refractive index: 1.59. Glass transition temperatures of the obtained resin particles were summarized in Table 1. The glass transition temperature of the resin particle was measured according to the procedures below. First, the water dispersion of the resin particle was heated to 60° C. to dryness, and then transferred into an aluminum vessel and sealed, to prepare a sample. Next, using a differential scanning calorimeter (for example, trade name "DSC Q1000", from TA Instruments), the sample was heated to 200° C. at 10° C./min, cooled down to −50° C. at 5° C./min, and again heated to 200° C. at 10° C./min, to measure the glass transition temperature (° C.).

Abbreviations in Table 1 are as follows.
AN: acrylonitrile
MAN: methacrylonitrile
CAN: 2-chloroacrylonitrile
St: styrene
EMA: ethyl methacrylate
MMA: methyl methacrylate
MAA: methacrylic acid
EDMA: ethylene glycol dimethacrylate

TABLE 1

| | | | Conditions of Preparation and Properties of Resin Particles | | | | | |
|---|---|---|---|---|---|---|---|---|
| | | | Core portion | | | | | |
| | | | Proportion of charged monomers (%) | | | | | |
| Resin particle | Amount of charge (part) | Cyano group-containing unit | | | Aromatic group-containing unit, etc. | | Anionic group-containing unit | Reactive surfactant unit |
| | | AN | MAN | CAN | St | EMA MMA | MAA | |
| 1 | 466 | 30 | | | 62 | | 5 | 3 |
| 2 | 466 | 30 | | | 37 | 25 | 5 | 3 |

TABLE 1-continued

Conditions of Preparation and Properties of Resin Particles

| 3  | 466 | 30 |    | 42 | 20 | 5 | 3 |
| 4  | 466 | 8  |    | 84 |    | 5 | 3 |
| 5  | 466 | 10 |    | 82 |    | 5 | 3 |
| 6  | 466 | 60 |    | 32 |    | 5 | 3 |
| 7  | 466 | 62 |    | 30 |    | 5 | 3 |
| 8  | 466 |    | 30 | 62 |    | 5 | 3 |
| 9  | 466 |    |    | 30 | 62 |   | 5 | 3 |
| 10 |     |    |    |    |    |   |   |
| 11 | 546 | 30 |    | 62 |    | 5 | 3 |
| 12 | 466 |    |    | 62 | 30 | 5 | 3 |
| 13 | 466 | 30 |    | 62 |    | 5 | 3 |
| 14 | 466 | 30 |    | 62 |    | 5 | 3 |
| 15 | 466 | 30 |    | 62 |    | 5 | 3 |
| 16 | 466 | 30 |    | 62 |    | 5 | 3 |

| | Shell portion | | | | | | |
|---|---|---|---|---|---|---|---|
| | | Proportion of charged monomers (%) | | | | | Glass |
| Resin particle | Amount of charge (part) | Aromatic group-containing unit, etc. | | | Anionic group-containing unit | Crosslinking agent unit | Reactive surfactant unit | transition temperature (° C.) |
| | | St | MMA | AN | MAA | EDMA | | |
| 1  | 80  | 42 |    |   | 15 | 42 | 1 | 115 |
| 2  | 80  | 42 |    |   | 15 | 42 | 1 | 90  |
| 3  | 80  | 42 |    |   | 15 | 42 | 1 | 95  |
| 4  | 80  | 42 |    |   | 15 | 42 | 1 | 117 |
| 5  | 80  | 42 |    |   | 15 | 42 | 1 | 116 |
| 6  | 80  | 42 |    |   | 15 | 42 | 1 | 112 |
| 7  | 80  | 42 |    |   | 15 | 42 | 1 | 111 |
| 8  | 80  | 42 |    |   | 15 | 42 | 1 | 116 |
| 9  | 80  | 42 |    |   | 15 | 42 | 1 | 116 |
| 10 | 546 | 42 |    |   | 15 | 42 | 1 | 142 |
| 11 |     |    |    |   |    |    |   | 113 |
| 12 | 80  | 42 |    |   | 15 | 42 | 1 | 115 |
| 13 | 80  |    | 42 |   | 15 | 42 | 1 | 115 |
| 14 | 80  | 57 |    |   |    | 42 | 1 | 112 |
| 15 | 80  | 84 |    |   | 15 |    | 1 | 112 |
| 16 | 80  | 37 |    | 5 | 15 | 42 | 1 | 115 |

(Resin Particle 17)

Mixed and kneaded were 67 parts of ethyl acrylate, 30 parts of methacrylonitrile, 3 parts of methacrylic acid, 0.5 parts of an anionic surfactant and 63 parts of deionized water, to thereby prepare an emulsion of monomer mixture. The anionic surfactant employed here was sodium polyoxyethylene alkyl ether sulfate (trade name "Latemul E-118B", from KAO Corporation, average degree of polymerization=500).

In another reaction vessel (polymerization tank) equipped with a stirrer, placed were 82.5 parts of deionized water, 0.3 parts of an anionic surfactant, and 2.0 parts of a nonionic surfactant. The anionic surfactant employed here was sodium polyoxyethylene alkyl ether sulfate (trade name "Latemul E-118B", from KAO Corporation). The nonionic surfactant employed here was polyoxyethylene cetyl ether (trade name "Emulgen 120", from KAO Corporation). The content was heated to 80° C., to which an aqueous solution obtained by dissolving 0.5 parts ammonium sulfate into 10.6 parts of water was added. The emulsion of monomer mixture was continuously added thereto over two hours to proceed polymerization. Upon completion of addition of the emulsion, the reaction was allowed to continue at 80° C. for 90 minutes, to thereby obtain an aqueous dispersion of resin particle 17 with a content of resin particle of 40%.

(Resin Particle 18)

Into a reaction vessel, 169 g of water was placed, and heated to 77° C. under stirring. Meanwhile, an aqueous emulsion was prepared by mixing 13.7 g of water, 0.7 g of polyoxyethylene alkyl ether sulfate, 17.7 g of styrene, and 37.5 g of butyl acrylate. The polyoxyethylene alkyl ether sulfate employed here was trade name "HITENOL BC-10" (from DKS Co., Ltd.). Two grams of the thus prepared aqueous emulsion was placed into the reaction vessel, and to which 0.37 g of potassium persulfate, dissolved in a minimum amount of water, was added. Fifteen minutes after, the residual part of the aqueous emulsion was fed to the reaction vessel over 72 minutes or longer, to thereby complete a first-stage polymerization.

An emulsion was prepared by mixing 34.9 g of water, 1.6 g of polyoxyethylene alkyl ether sulfate, 21.1 g of styrene, 99.0 g of methyl methacrylate, 6.1 g of butyl acrylate, and 2.6 g of methacrylic acid. The obtained emulsion was fed to the reaction vessel over 168 minutes or longer, to thereby complete a second-stage polymerization. The polyoxyethylene alkyl ether sulfate employed here was trade name "HITENOL BC-10" (from DKS Co., Ltd.). The residual part of the monomer was reduced using ascorbic acid and t-butyl hydroperoxide according to a known method, and then cooled down to 25° C. Aqueous potassium hydroxide solution was added to adjust pH to 8, and an aqueous anti-mold agent suitable for ink jet was added, to thereby obtain an aqueous dispersion of resin particle 18 with a content of resin particle of 40%.

<Synthesis of Water-Soluble Resin>

Monomers were polymerized according to an ordinary method to synthesize water-soluble acrylic resins, which are random copolymers having chemical compositions and characteristics summarized in Table 2. The anionic group was neutralized by adding an aqueous solution containing potassium hydroxide whose amount is equimolar to the acid value, and a proper amount of water was further added to obtain an aqueous solution of the water-soluble resin with a resin content of 10.0%. The water-soluble resin was dissolved in tetrahydrofuran to prepare a sample for measurement, and the sample was subjected to potentiometric titration using an automatic potentiometric titrator (trade name "AT510", from Kyoto Electronics Manufacturing Co., Ltd.) and potassium hydroxide titration solution in ethanol, to thereby measure the acid value of the water-soluble resin. Each water-soluble resin was found to have a weight-average molecular weight, when measured by GPC on the polystyrene basis, of 10,000.

Abbreviations in Table 2 are as follows.
St: styrene
BzMA: benzyl methacrylate
BA: n-butyl acrylate
AA: acrylic acid

TABLE 2

Synthetic Conditions and Properties of Water-Soluble Resin

| Water-soluble resin | Unit (%) | | | | Acid value (mgKOH/g) |
|---|---|---|---|---|---|
| | St | BzMA | BA | AA | |
| 1 | 60 | | 22 | 18 | 140 |
| 2 | | 60 | 22 | 18 | 140 |
| 3 | 82 | | | 18 | 140 |
| 4 | 60 | | 28 | 12 | 90 |
| 5 | 60 | | 27 | 13 | 100 |
| 6 | 60 | | 17 | 23 | 180 |
| 7 | 60 | | 16 | 24 | 190 |

<Preparation of Ink>

The individual components (in %) listed in the upper lines of Table 3 were mixed, thoroughly stirred, and filtered under pressure through a microfilter (from FUJIFILM Corporation) with a pore size of 3.0 μm, to thereby prepare each ink. In Table 3, "Acetylenol E100" is a trade name of a nonionic surfactant manufactured by Kawaken Fine Chemicals Co., Ltd. Lower lines of Table 3 list properties of the inks. All of the thus prepared inks were found to have pH within the range from 8.5 to 9.0.

The minimum film forming temperature of the ink was measured using a minimum film forming temperature meter (trade name "MFFT-90", from Rhopoint Instruments). Since the inks of Example 26, Comparative Example 9 and Comparative Example 10 were free of coloring material, so that the inks per se were used as samples for measurement. For the inks other than those of Example 26, Comparative Example 9 and Comparative Example 10, evaluation inks were prepared by replacing the pigment dispersion with water, and used as samples for measurement. Each measurement sample was coated using an applicator on a polyethylene terephthalate film, and the film was set on a minimum film forming temperature meter with temperature gradient. The coating was observed two hours after, and a temperature corresponded to a boundary between white part and transparent part was read as the minimum film forming temperature.

TABLE 3

Chemical Compositions and Properties of Inks

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Number of resin particle | 1 | 2 | 3 | 1 | 1 | 1 | 1 | 4 | 5 | 6 | 7 | 8 | 9 |
| Number of water-soluble resin | 1 | 1 | 1 | 1 | 1 | 1 | 1 | 1 | 1 | 1 | 1 | 1 | 1 |
| Pigment dispersion | 20.0 | 20.0 | 20.0 | 20.0 | 20.0 | 20.0 | 20.0 | 20.0 | 20.0 | 20.0 | 20.0 | 20.0 | 20.0 |
| Aqueous dispersion of resin particle | 15.0 | 15.0 | 15.0 | 15.0 | 15.0 | 15.0 | 15.0 | 15.0 | 15.0 | 15.0 | 15.0 | 15.0 | 15.0 |
| Aqueous solution of water-soluble resin | 2.5 | 2.5 | 2.5 | 2.5 | 2.5 | 2.5 | 2.5 | 2.5 | 2.5 | 2.5 | 2.5 | 2.5 | 2.5 |
| 2-Pyrrolidone | 4.5 | 4.5 | 4.5 | 7.8 | 7.5 | 1.5 | 1.2 | 4.5 | 4.5 | 4.5 | 4.5 | 4.5 | 4.5 |
| N-methyl-2-pyrrolidone | | | | | | | | | | | | | |
| 1-(2-Hydroxyethyl)-2-pyrrolidone | | | | | | | | | | | | | |
| 1,3-Dimethyl-2-imidazolidinone | | | | | | | | | | | | | |
| 1,3-Bis(2-hydroxyethyl)-5,5-dimethylhydantoin | | | | | | | | | | | | | |
| 2-Piperidone | | | | | | | | | | | | | |
| Diethylene glycol monoethyl ether | | | | | | | | | | | | | |
| 1,2-Butanediol | | | | | | | | | | | | | |
| Tripropylene glycol monomethyl ether | | | | | | | | | | | | | |
| Butyl sebacate | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 |
| Pure water | 57.5 | 57.5 | 57.5 | 54.2 | 54.5 | 60.5 | 60.8 | 57.5 | 57.5 | 57.5 | 57.5 | 57.5 | 57.5 |
| Minimum film forming temperature (° C.) | 27 | 24 | 27 | 24 | 25 | 30 | 32 | 32 | 27 | 26 | 23 | 27 | 32 |
| Content of cyclic amides C (%) | 4.5 | 4.5 | 4.5 | 7.8 | 7.5 | 1.5 | 1.2 | 4.5 | 4.5 | 4.5 | 4.5 | 4.5 | 4.5 |
| Content of resin particle R (%) | 3.0 | 3.0 | 3.0 | 3.0 | 3.0 | 3.0 | 3.0 | 3.0 | 3.0 | 3.0 | 3.0 | 3.0 | 3.0 |
| C/R value (times) | 1.5 | 1.5 | 1.5 | 2.6 | 2.5 | 0.5 | 0.4 | 1.5 | 1.5 | 1.5 | 1.5 | 1.5 | 1.5 |

TABLE 3-continued

Chemical Compositions and Properties of Inks

| | Example | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Number of resin particle | 1 | 1 | 1 | 1 | 1 | 1 | 1 | 1 | 1 | 1 | 1 | 1 | 1 |
| Number of water-soluble resin | 1 | 1 | 1 | 1 | 1 | — | 2 | 3 | 4 | 5 | 6 | 7 | 1 |
| Pigment dispersion | 20.0 | 20.0 | 20.0 | 20.0 | 20.0 | 20.0 | 20.0 | 20.0 | 20.0 | 20.0 | 20.0 | 20.0 | |
| Aqueous dispersion of resin particle | 15.0 | 15.0 | 15.0 | 15.0 | 15.0 | 15.0 | 15.0 | 15.0 | 15.0 | 15.0 | 15.0 | 15.0 | 15.0 |
| Aqueous solution of water-soluble resin | 2.5 | 2.5 | 2.5 | 2.5 | 2.5 | | 2.5 | 2.5 | 2.5 | 2.5 | 2.5 | 2.5 | 2.5 |
| 2-Pyrrolidone | | | | | | 4.5 | 4.5 | 4.5 | 4.5 | 4.5 | 4.5 | 4.5 | 4.5 |
| N-methyl-2-pyrrolidone | 4.5 | | | | | | | | | | | | |
| 1-(2-Hydroxyethyl)-2-pyrrolidone | | 4.5 | | | | | | | | | | | |
| 1,3-Dimethyl-2-imidazolidinone | | | 4.5 | | | | | | | | | | |
| 1,3-Bis(2-hydroxyethyl)-5,5-dimethylhydantoin | | | | 4.5 | | | | | | | | | |
| 2-Piperidone | | | | | 4.5 | | | | | | | | |
| Diethylene glycol monoethyl ether | | | | | | | | | | | | | |
| 1,2-Butanediol | | | | | | | | | | | | | |
| Tripropylene glycol monomethyl ether | | | | | | | | | | | | | |
| Butyl sebacate | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 |
| Pure water | 57.5 | 57.5 | 57.5 | 57.5 | 57.5 | 60.0 | 57.5 | 57.5 | 57.5 | 57.5 | 57.5 | 57.5 | 77.5 |
| Minimum film forming temperature (° C.) | 27 | 27 | 27 | 27 | 32 | 28 | 24 | 30 | 31 | 30 | 25 | 24 | 27 |
| Content of cyclic amides C (%) | 4.5 | 4.5 | 4.5 | 4.5 | 4.5 | 4.5 | 4.5 | 4.5 | 4.5 | 4.5 | 4.5 | 4.5 | 4.5 |
| Content of resin particle R (%) | 3.0 | 3.0 | 3.0 | 3.0 | 3.0 | 3.0 | 3.0 | 3.0 | 3.0 | 3.0 | 3.0 | 3.0 | 3.0 |
| C/R value (times) | 1.5 | 1.5 | 1.5 | 1.5 | 1.5 | 1.5 | 1.5 | 1.5 | 1.5 | 1.5 | 1.5 | 1.5 | 1.5 |

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Number of resin particle | 10 | 11 | 12 | 13 | 14 | 15 | 16 | 1 | 17 | 18 | 18 |
| Number of water-soluble resin | 1 | 1 | 1 | 1 | 1 | 1 | 1 | 1 | — | — | 1 |
| Pigment dispersion | 20.0 | 20.0 | 20.0 | 20.0 | 20.0 | 20.0 | 20.0 | 20.0 | | | 20.0 |
| Aqueous dispersion of resin particle | 15.0 | 15.0 | 15.0 | 15.0 | 15.0 | 15.0 | 15.0 | 15.0 | 7.5 | 7.5 | 7.5 |
| Aqueous solution of water-soluble resin | 2.5 | 2.5 | 2.5 | 2.5 | 2.5 | 2.5 | 2.5 | 2.5 | | | 2.5 |
| 2-Pyrrolidone | 4.5 | 4.5 | 4.5 | 4.5 | 4.5 | 4.5 | 4.5 | | 4.5 | | 4.5 |
| N-methyl-2-pyrrolidone | | | | | | | | | | | |
| 1-(2-Hydroxyethyl)-2-pyrrolidone | | | | | | | | | | | |
| 1,3-Dimethyl-2-imidazolidinone | | | | | | | | | | | |
| 1,3-Bis(2-hydroxyethyl)-5,5-dimethylhydantoin | | | | | | | | | | | |
| 2-Piperidone | | | | | | | | | | | |
| Diethylene glycol monoethyl ether | | | | | | | | | 4.5 | | |
| 1,2-Butanediol | | | | | | | | | | 5.4 | |
| Tripropylene glycol monomethyl ether | | | | | | | | | | 0.6 | |
| Butyl sebacate | | | | | | | | | | 0.225 | |
| Acetylenol E100 | 0.5 | 0.5 | 0.5 | 0.5 | 0.5 | 0.5 | 0.5 | 0.5 | | | 0.5 |
| Pure water | 57.5 | 57.5 | 57.5 | 57.5 | 57.5 | 57.5 | 57.5 | 57.5 | 88.0 | 86.275 | 65.0 |
| Minimum film forming temperature (° C.) | 58 | 21 | 43 | 21 | 25 | 23 | 22 | 45 | 5 | 27 | 37 |
| Content of cyclic amides C (%) | 4.5 | 4.5 | 4.5 | 4.5 | 4.5 | 4.5 | 4.5 | 0.0 | 4.5 | 0.0 | 4.5 |
| Content of resin particle R (%) | 3.0 | 3.0 | 3.0 | 3.0 | 3.0 | 3.0 | 3.0 | 3.0 | 1.5 | 1.5 | 1.5 |
| C/R value (times) | 1.5 | 1.5 | 1.5 | 1.5 | 1.5 | 1.5 | 1.5 | 0.0 | 3.0 | 0.0 | 3.0 |

<Preparation of Pigment Ink>

The individual components listed below are mixed, thoroughly stirred, and then filtered under pressure through a microfilter (from FUJIFILM Corporation) with a pore size of 3.0 μm, to thereby prepare a pigment ink. The thus prepared pigment ink was used for evaluating the inks, free of the coloring material, in Example 26, Comparative Example 9 and Comparative Example 10.

Pigment dispersion: 20.0%
Acetylenol E100: 0.5%
Pure water: 79.5%

<Evaluation>

Each of the thus prepared inks was filled in the ink cartridge, and mounted on an ink jet recording apparatus (trade name "PIXUS Pro-10", from Canon Inc.) equipped with a recording head that ejects ink with the aid of heat energy. With such ink jet recording apparatus, a recording duty of 100% is defined when an image is recorded in a unit area of 1/600 inch×1/600 inch, by applying 8 ink droplets, each droplet having a mass of 3.8 ng±10%. Recording was carried out in an environment with a temperature of 25° C. and a relative humidity of 55%. In the evaluation criteria for the individual items below, "A" and "B" were considered to represent acceptable levels in the present invention, and "C" was considered to represent an unacceptable level. Evaluation results are summarized in Table 4. The ink of Comparative Example 5 could not be ejected, and was therefore not subjected to evaluation below.

(Abrasion Resistance)

Using the aforementioned ink jet recording apparatus, an image described below was recorded on a recording medium (coated paper, trade name "Canon Photo Paper Pro Platinum", from Canon Inc.), to evaluate the abrasion resistance. For the inks of Example 26, Comparative Example 9 and Comparative Example 10, the pigment ink prepared previously was used to record a solid image with a recording duty of 100%, and dried for a day. Then, each ink was used to record a solid image with a recording duty of 100%, so as to overlap the solid image recorded using the pigment ink. Each of the inks other than those of Example 26, Comparative Example 9 and Comparative Example 10 was used to record a solid image with a recording duty of 100%. The recorded image was dried for a day, and rubbed under the face of a fingernail several times. Conditions of scratch were visually observed, and the abrasion resistance of images was evaluated according to the criteria below:

A: no scratch;
B: scratched, leaving the recording medium unexposed; and
C: scratched, with the recording medium exposed.

(Gloss Clarity)

Using the aforementioned ink jet recording apparatus, an image described below was recorded on a recording medium (coated paper, trade name "Canon Photo Paper Pro Platinum", from Canon Inc.), to evaluate the gloss clarity. For the inks of Example 26, Comparative Example 9 and Comparative Example 10, the pigment ink prepared previously was used to record a solid image with a recording duty of 100%, and dried for a day. Then, each ink was used to record a solid image with a recording duty of 100%, so as to overlap the solid image recorded using the pigment ink. Each of the inks other than those of Example 26, Comparative Example 9 and Comparative Example 10 was used to record a solid image with a recording duty of 100%. The recorded image was dried for a day, and onto which two fluorescent tubes, which are observation light sources arranged 10 cm away from each other, were projected from positions 2 meters away from the image. Shapes of the fluorescent tubes projected on the image were visually observed at an angle of illumination of 45° and an angle of observation of 45°, and the gloss clarity of image was evaluated according to the criteria below:

A: boundary between two projected fluorescent tubes recognizable, without bluffed edges;
B: boundary between two projected fluorescent tubes recognizable, with slightly bluffed edges; and
C: boundary between two projected fluorescent tubes not recognizable.

TABLE 4

| | | Results of Evaluation | |
| --- | --- | --- | --- |
| | | Abrasion resistance | Gloss clarity |
| Example | 1 | A | A |
| | 2 | A | B |
| | 3 | A | A |
| | 4 | A | B |
| | 5 | A | A |
| | 6 | A | A |
| | 7 | B | A |
| | 8 | B | A |
| | 9 | A | A |
| | 10 | A | A |
| | 11 | A | B |
| | 12 | A | A |
| | 13 | B | A |
| | 14 | A | A |
| | 15 | A | A |
| | 16 | A | A |
| | 17 | A | A |
| | 18 | B | A |
| | 19 | B | A |
| | 20 | A | A |
| | 21 | A | A |
| | 22 | B | A |
| | 23 | A | A |
| | 24 | A | A |
| | 25 | A | B |
| | 26 | A | A |
| Comparative Example | 1 | C | B |
| | 2 | A | C |
| | 3 | C | B |
| | 4 | A | C |
| | 5 | not ejected | not ejected |
| | 6 | A | C |
| | 7 | A | C |
| | 8 | C | B |
| | 9 | A | C |
| | 10 | A | C |
| | 11 | C | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-122711, filed Jul. 1, 2019, and Japanese Patent Application No. 2020-105518, filed Jun. 18, 2020, which are hereby incorporated by reference herein in their entirety.

What is claimed is:

1. An aqueous ink for ink jet comprising:
a resin particle; and
a water-soluble organic solvent,
wherein the resin particle has a core portion that comprises a cyano group-containing unit, and a shell portion that comprises an aromatic group-containing unit, an anionic group-containing unit, and a unit derived from a crosslinking agent, but free of cyano group-containing unit, and wherein the water-soluble organic solvent comprises a cyclic amide.

2. The aqueous ink according to claim 1, wherein the resin particle has a glass transition temperature of 95° C. or more, and a minimum film forming temperature of 30° C. or less.

3. The aqueous ink according to claim 1, wherein a percentage (% by mass) of the cyano group-containing unit in the core portion is 10% by mass or more to 60% by mass or less.

4. The aqueous ink according to claim 1, wherein the cyano group-containing unit is a unit derived from at least one of acrylonitrile or methacrylonitrile.

5. The aqueous ink according to claim 1, wherein the cyclic amide is at least one selected from the group consisting of 2-pyrrolidone, N-methyl-2-pyrrolidone, 1-(2-hydroxyethyl)-2-pyrrolidone, 1,3-dimethyl-2-imidazolidinone and 1,3-bis(2-hydroxyethyl)-5,5-dimethylhydantoin.

6. The aqueous ink according to claim 1, wherein the content (% by mass) of the cyclic amide, when expressed in mass ratio relative to the content (% by mass) of the resin particle, is 0.5 times or more to 2.5 times or less.

7. The aqueous ink according to claim 1, further comprising a water-soluble resin having an acid value of 100 mgKOH/g or more to 180 mgKOH/g or less.

8. The aqueous ink according to claim 1, further comprising a coloring material.

9. An ink cartridge comprising an ink, and an ink storage portion that stores the ink, the ink being the aqueous ink as defined in claim 1.

10. An ink jet recording method by which an image is recorded on a recording medium with an ink ejected from a recording head of an ink jet system, the ink being the aqueous ink as defined in claim 1.

* * * * *